United States Patent
Kim et al.

(10) Patent No.: US 11,441,599 B2
(45) Date of Patent: Sep. 13, 2022

(54) AIR FOIL JOURNAL BEARING

(71) Applicant: NEUROS CO., LTD, Daejeon (KR)

(72) Inventors: Seung Woo Kim, Daejeon (KR); Ho-Jin Choi, Daejeon (KR)

(73) Assignee: NEUROS CO., LTD., Daejeon (KR)

( * ) Notice: Subject to any disclaimer, the term of this patent is extended or adjusted under 35 U.S.C. 154(b) by 0 days.

(21) Appl. No.: 17/242,676

(22) Filed: Apr. 28, 2021

(65) Prior Publication Data

US 2022/0186773 A1 Jun. 16, 2022

(30) Foreign Application Priority Data

Dec. 10, 2020 (KR) .................. 10-2020-0172499

(51) Int. Cl.
*F16C 17/02* (2006.01)
*F16C 27/02* (2006.01)

(52) U.S. Cl.
CPC ............ *F16C 17/024* (2013.01); *F16C 27/02* (2013.01)

(58) Field of Classification Search
CPC ................................. F16C 17/024; F16C 27/02
See application file for complete search history.

(56) References Cited

U.S. PATENT DOCUMENTS

| | | | | |
|---|---|---|---|---|
| 2015/0159689 A1* | 6/2015 | Omori | ................... | F16C 17/024 384/103 |
| 2016/0312655 A1* | 10/2016 | Yoshino | ............... | F04D 29/057 |
| 2020/0240464 A1* | 7/2020 | Lim | ...................... | F16C 17/024 |
| 2020/0291953 A1* | 9/2020 | Perevozchikov | ..... | F04D 29/057 |

FOREIGN PATENT DOCUMENTS

| | | |
|---|---|---|
| JP | 2010-529390 A | 8/2010 |
| JP | 2015-143572 A | 8/2015 |
| KR | 10-1558490 B1 | 10/2015 |
| KR | 10-1706379 B1 | 2/2017 |
| WO | WO-2019228803 A1 * | 12/2019 ............ F16C 17/024 |

OTHER PUBLICATIONS

Office Action of Korean Patent Application No. 10-2020-0172499—5 pages (dated Feb. 8, 2021).

* cited by examiner

*Primary Examiner* — Alan B Waits
(74) *Attorney, Agent, or Firm* — Knobbe Martens Olson & Bear LLP

(57) ABSTRACT

Provided is an air foil journal bearing including a bearing housing; a bump foil disposed inside the bearing housing, having an uneven-shaped elastic bump, having one end coupled and fixed to the bearing housing in the circumferential direction, and having the other end formed as a free end; an outer top foil disposed inside the bump foil; an inner top foil disposed inside the outer top foil; and a middle top foil interposed between the outer top foil and the inner top foil, and coupled and fixed to the bearing housing, thereby preventing deviation of the free end of the bump foil in the width direction due to vibration occurring when a rotor is rotated at a high speed.

9 Claims, 8 Drawing Sheets

AIR FOIL JOURNAL BEARING

CROSS-REFERENCE TO RELATED APPLICATIONS

This application claims priority under 35 U.S.C. § 119 to Korean Patent Application No. 10-2020-0172499, filed on Dec. 10, 2020, in the Korean Intellectual Property Office, the disclosure of which is incorporated herein by reference in its entirety.

TECHNICAL FIELD

The following disclosure relates to an air foil journal bearing supporting a radial load of a rotor.

BACKGROUND

An air foil bearing is a bearing supporting a load by forming a pressure by introducing a viscous fluid or air between a rotor or a bearing disk and a foil in contact therewith as the rotor (or rotating shaft) is rotated at a high speed.

In addition, among the air foil bearings, the air foil journal bearing is a bearing supporting a radial load of the rotor in a direction perpendicular to the rotor. JP 2010-529390 A (Aug. 26, 2010) discloses the related technology. The disclosure of this section is to provide background information relating to the present disclosure. Applicant does not admit that any information contained in this section constitutes prior art.

SUMMARY

The present disclosure relates to a structure of an air foil journal bearing capable of preventing deviation of a bump foil due to vibration occurring when the rotor is rotated at a high speed. An embodiment of the present disclosure is directed to providing an air foil journal bearing supporting a radial load of a rotor, in which a free end of its bump foil is prevented from being deviated from the bearing in a central axis direction of a bearing housing.

In one general aspect, an air foil journal bearing includes: a bearing housing having a through hole in which a rotor is disposed; a bump foil disposed inside the bearing housing and formed in a circumferential direction thereof, having an uneven-shaped elastic bump, having one end coupled and fixed to the bearing housing in the circumferential direction, and having the other end formed as a free end; an outer top foil disposed inside the bump foil, formed in the circumferential direction, and having one end coupled and fixed to the bearing housing; an inner top foil disposed inside the outer top foil, formed in the circumferential direction, and having one end coupled and fixed to the bearing housing; and a middle top foil interposed between the outer top foil and the inner top foil, formed in the circumferential direction, and having one end coupled and fixed to the bearing housing, wherein the outer top foil and the inner top foil each have a fixed tab formed by extending from a portion between both sides of the other end of the foil in a width direction thereof, and the outer top foil, the middle top foil and the inner top foil each have a through hole formed at one side thereof, the through hole passing through the inside and outside of the foil at a position corresponding to a position of the fixed tab of the inner top foil, the free end of the bump foil has a through hole passing through the inside and outside of the foil at a position corresponding to a position of the fixed tab formed between both the sides of the free end in the width direction, and the outer top foil and the inner top foil are each rolled in one or more turns, and the fixed tabs of the outer top foil and inner top foil are each inserted through and disposed in the through holes of the inner top foil, the middle top foil, the outer top foil and the bump foil.

In addition, the fixed tabs of the outer top foil and inner top foil may each extend to have a cross-section of a straight line or a cross-section of a curved line inflected from a curved portion of the foil.

In addition, the through hole of the bump foil may have a shape in which a portion of the free end is open in the circumferential direction.

In addition, the inner top foil may have a support protrusion protruding inward from a circumference of its through hole, and an outer circumferential surface of the outer top foil may be in contact with and elastically supported by the support protrusion.

In addition, a slot may be formed in each of the sides of the support protrusion of the inner top foil in the width direction.

In addition, the outer top foil may have a support protrusion protruding inward from a circumference of its through hole, and an outer circumferential surface of the outer top foil may be in contact with and elastically supported by the support protrusion.

In addition, a slot may be formed in each of the sides of the support protrusion of the outer top foil in the width direction.

In addition, the fixed tabs of the outer top foil and inner top foil may be bent outward in a radial direction of the foil, and the fixed tabs may protrude outward from the outer circumferential surface of the outer top foil, and the fixed tabs may each be disposed at a position overlapping the free end of the bump foil at at least one point in the radial and circumferential directions.

In addition, the free end of the bump foil may be formed as the elastic bump having a convexly curved surface inward in the radial direction, and a peak portion of the elastic bump forming the free end may be disposed adjacent to or in contact with the outer circumferential surface of the outer top foil.

Other features and aspects will be apparent from the following detailed description, the drawings and the claims.

DETAILED DESCRIPTION OF EMBODIMENTS

Hereinafter, an air foil journal bearing according to embodiments of the present disclosure as described above will be described in detail with reference to the accompanying drawings.

Figure 1:
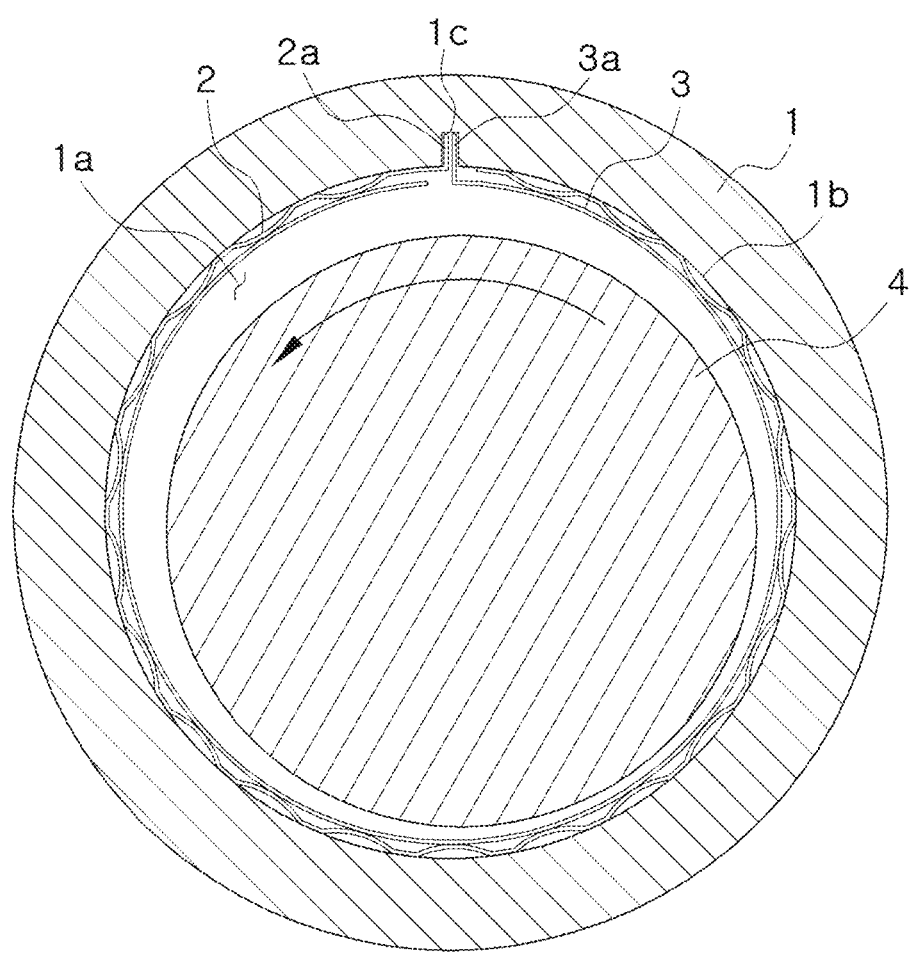
FIG. 1 is a cross-sectional view showing an example air foil journal bearing.

Referring to FIG. 1, an example air foil journal bearing may be configured as follows: a bump foil 2 is installed along an inner circumferential surface 1b of a through hole 1a of a bearing housing 1; a top foil 3 is disposed inside the bump foil 2; a rotor 4 (or rotating shaft) is disposed inside the top foil 3; and the rotor is rotated in a state in which an inner circumferential surface of the top foil 3 and an outer circumferential surface of the rotor 4 are spaced apart from each other. In addition, the bump foil 2 and the top foil 3 may each have a bent portion in which its one end in a circumferential direction is bent outward in a radial direction, and its bent portions 2a and 3a may be inserted into and fixed to a groove 1c formed in the bearing housing 1. Therefore, when stopped, the rotor may be in contact with and supported by a lower side of the inner circumferential surface of the top foil due to its own weight. When starting its operation by being rotated, the rotor may float away from the lower side of the inner circumferential surface of the top foil by an air pressure increased between a lower side of the rotor and the top foil, and the rotor may thus be rotated.

However, the other end of the bump foil 2 may not be fixed to the bearing housing 1 and may be formed as a free end which may move freely, and the free end of the bump foil may thus be deviated from the bearing in a central axis direction of the housing when vibration occurs as the rotor is rotated at a high speed.

Figure 2:
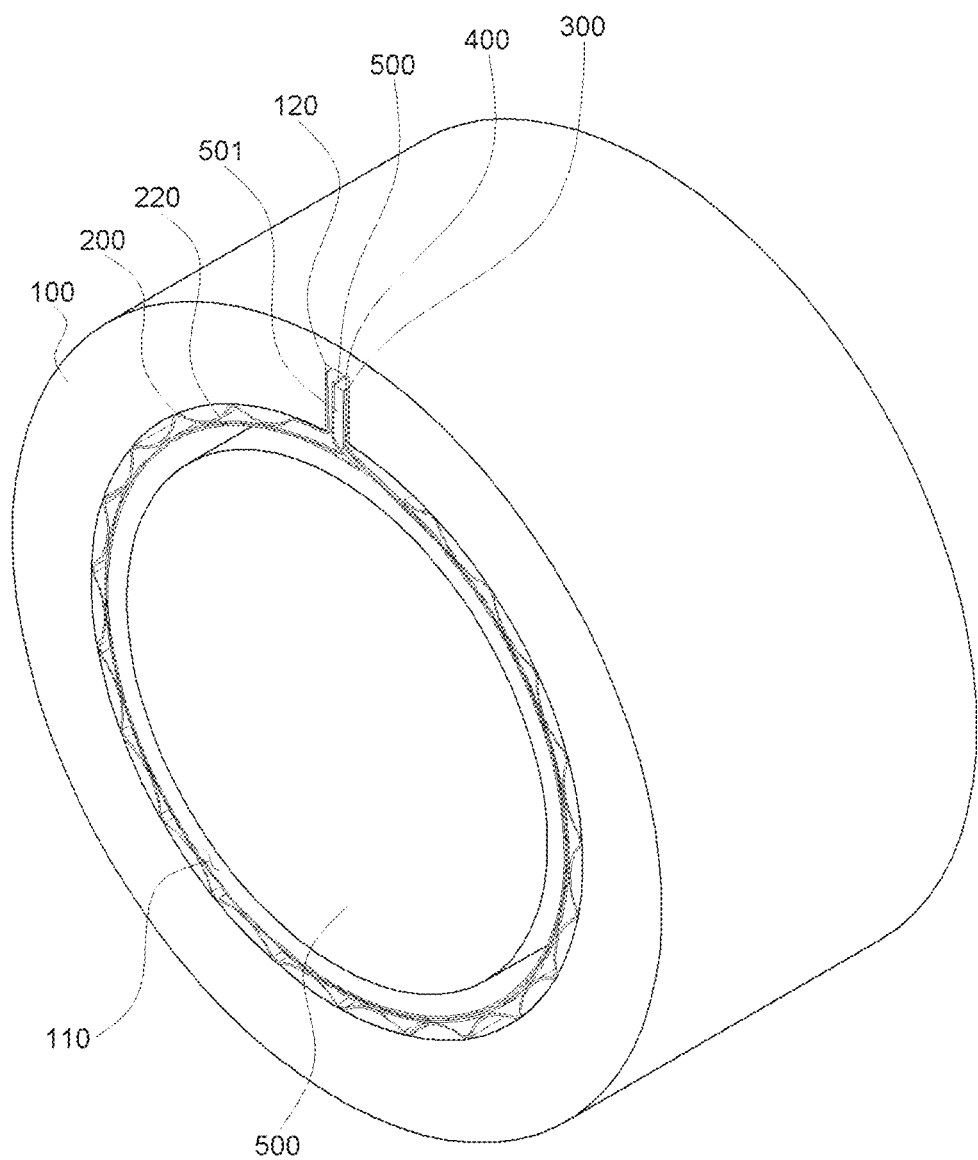
FIGS. 2 to 4 are an assembled perspective view, an exploded perspective view and a partial perspective view, respectively showing an air foil journal bearing according to an embodiment of the present disclosure.
Figure 3:
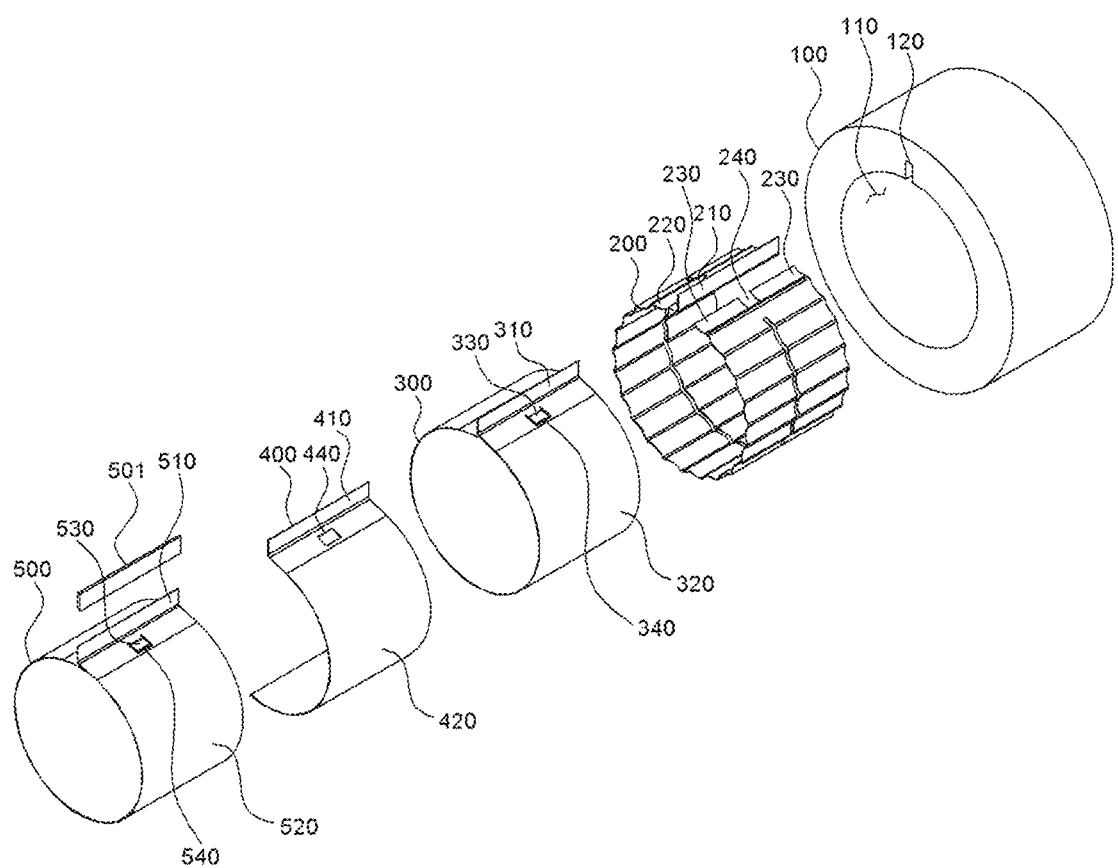
Figure 4:
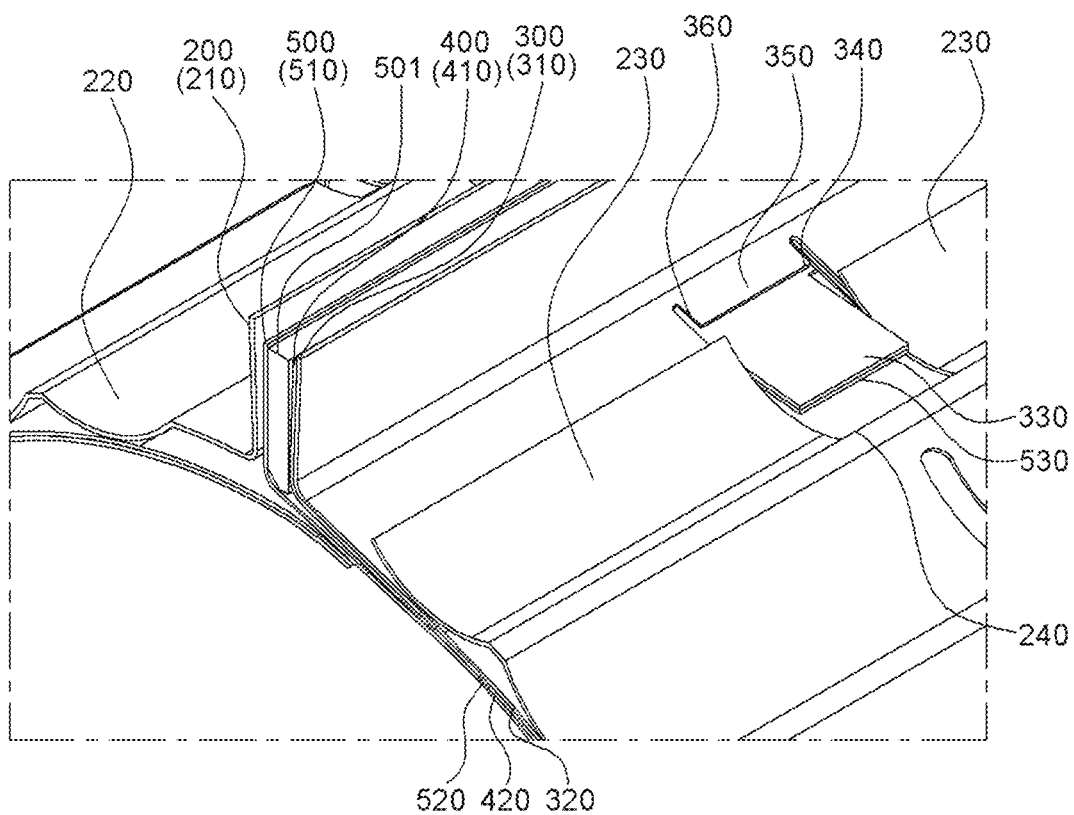
Figure 5:
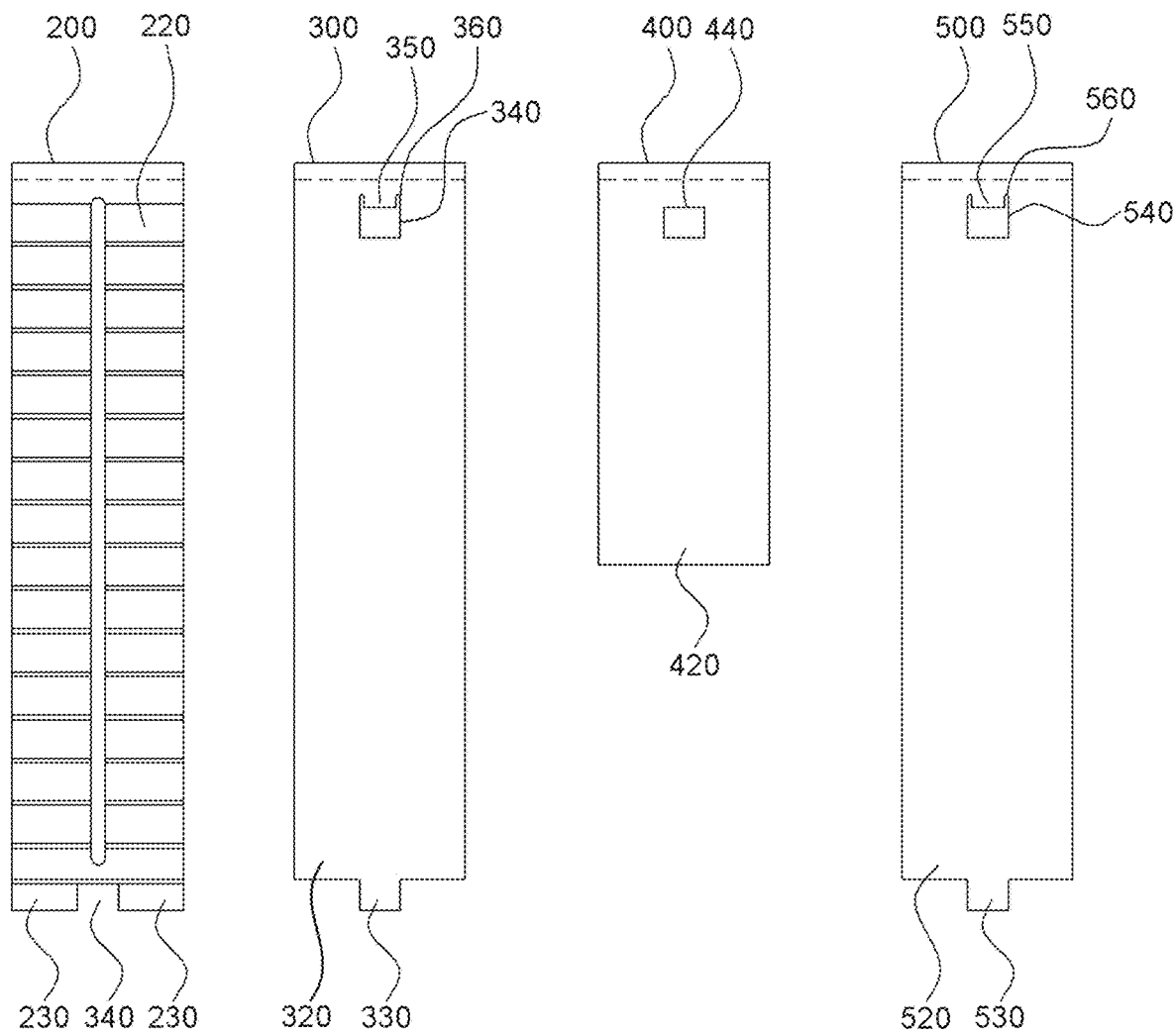
FIG. 5 is a development view showing a bump foil, an outer top foil, a middle top foil and an inner top foil of the air foil journal bearing according to an embodiment of the present disclosure.
Figure 6:
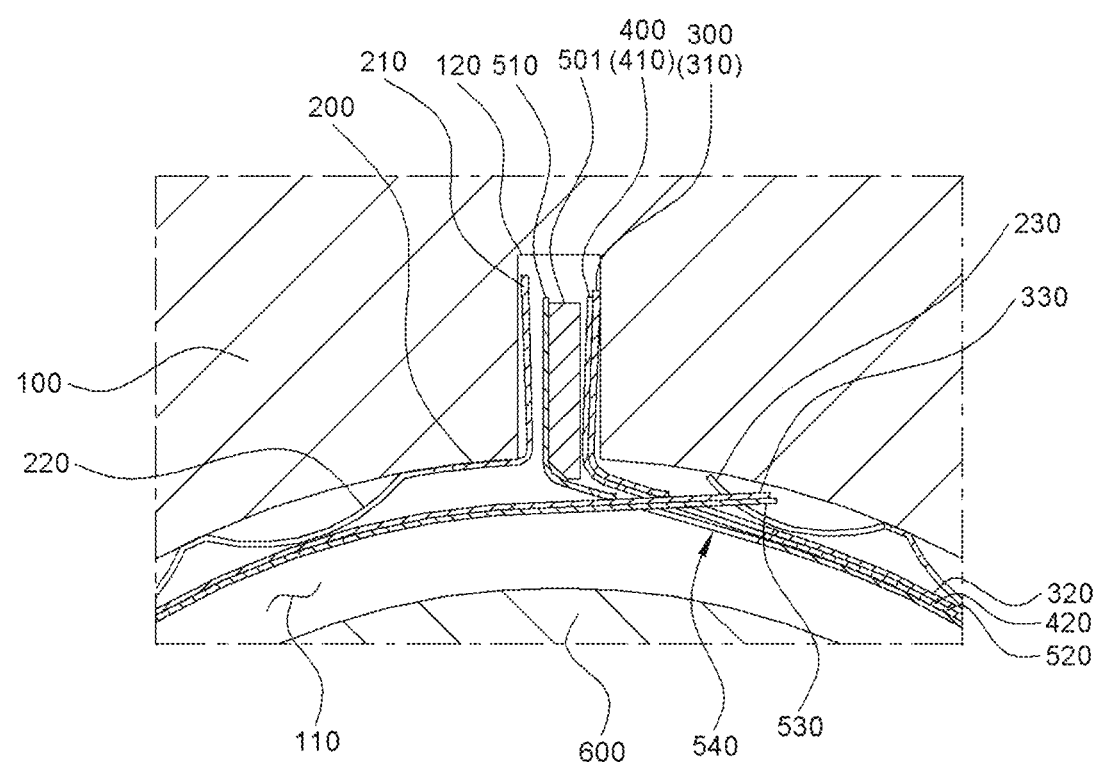
FIG. 6 is a front cross-sectional view partially showing the air foil journal bearing according to an embodiment of the present disclosure.

FIGS. 2 to 4 are an assembled perspective view, an exploded perspective view and a partial perspective view, respectively showing an air foil journal bearing according to an embodiment of the present disclosure; FIG. 5 is a development view showing a bump foil, an outer top foil, a middle top foil and an inner top foil of the air foil journal bearing according to an embodiment of the present disclosure; and FIG. 6 is a front cross-sectional view partially showing the air foil journal bearing according to an embodiment of the present disclosure.

As shown in the drawings, the air foil journal bearing according to an embodiment of the present disclosure may roughly include: a bearing housing 100, a bump foil 200, an outer top foil 300, a middle top foil 400 and an inner top foil 500.

The bearing housing 100 may have a through hole 110 formed therein, through which its both sides are penetrated in a central axis direction, and may have a key groove 120 formed concave and outward from an upper side of its inner circumferential surface in a radial direction thereof and formed continuously in a longitudinal direction which is the axis direction to communicate with the through hole 110.

The bump foil 200 may be disposed in the through hole 110 of the bearing housing 100, and the bump foil 200 may have a bent portion 210 in which one end of the bump foil 200 in its circumferential direction is bent outward in the radial direction. In addition, the bent portion 210 may be inserted into and coupled to the key groove 120, thereby fixing one end of the bump foil 200 to the bearing housing. In addition, the bump foil 200 may be disposed in the circumferential direction by being in close contact with the inner circumferential surface of the bearing housing 100. The bump foil 200 may be formed in a thin plate shape and have a plurality of elastic bumps 220 which protrude in the shape of a convexly curved surface with respect to its rolled inside, and are spaced apart from each other in the circumferential direction. In addition, the bump foil 200 may be formed extending from its one end fixed to the bearing housing 100 in a counterclockwise direction. In addition, the bump foil 200 may have the other end formed as a free end 230, and the free end 230 may thus move freely. In addition, the last elastic bump 220 may be formed as the free end 230 of the bump foil 200. The free end 230 may have its end portion spaced apart from the inner circumferential surface of the bearing housing 100, and have a convex portion inward, adjacent to or in contact with an outer circumferential surface of the outer top foil 300.

In addition, the bump foil 200 may have a through hole 240 formed by concavely cutting a middle portion between both sides of the free end 230 in a width direction thereof starting from the end portion of the free end 230 in the circumferential direction. In embodiments, the through hole 240 of the bump foil 200 may have a shape in which a portion of the free end is open in the circumferential direction. In addition, bump foil 200 may be formed to be divided into two or more portions throughout the other range in which the elastic bumps 220 are formed excluding portions respectively adjacent to the bent portion 210 of one end of the bump foil 200 and the free end 230 on the other end thereof in the width direction, which is the central axis direction of the bearing housing. Here, there may be a connection portion connecting the two divided portions in the middle. In addition to this type, the bump foil 200 may be formed in various shapes.

The outer top foil 300 may be disposed inside the bump foil 200, one end of the outer top foil 300 that is disposed in the circumferential direction may be bent outward in the radial direction to form a bent portion 310, and the bent portion 310 may be inserted into the key groove 120, thereby fixing the outer top foil 300 to the bearing housing 100. In addition, the outer top foil 300 may have a curved portion 320 extending from a lower end of the bent portion 310 in a clockwise direction. Here, the curved portion 320 may be formed in a flat plane shape in its portion adjacent to the lower end of the bent portion 310, and may be formed in a curved shape such as an arc shape in its region in which the outer circumferential surface of the outer top foil 300 is supported by the elastic bump 220 of the bump foil 200. In addition, the outer top foil 300 may include a through hole 340 formed in a central portion of one end thereof in the circumferential direction, in which the central portion is a position between both sides of the outer top foil 300 in the width direction, and passing through the inside and outside of the outer top foil 300; and a fixed tab 330 formed at the other end of the outer top foil 300 in the circumferential direction by extending from the central portion of the outer top foil 300 in the width direction. In addition, as shown in the drawings, the outer top foil 300 may be rolled in one or more turns, and the other end of the outer top foil 300 may have a portion overlapping one end thereof. Here, the fixed tab 330 of the outer top foil 300 may be inserted through and coupled to the through hole 340 formed in one end of the outer top foil 300. In addition to this type, the outer top foil 300 may be formed in various shapes.

The inner top foil 500 may be disposed inside the outer top foil 300, one end of the inner top foil 500 that is disposed in the circumferential direction may be bent outward in the radial direction to form a bent portion 510, and the bent portion 510 and a key 501 may be inserted into the key groove 120 in a state in which the key 501 is coupled to the bent portion 510, thereby fixing the inner top foil 500 to the bearing housing 100. In addition, the inner top foil 500 may have a curved portion 520 extending from a lower end of the bent portion 510 in the clockwise direction. Here, the curved portion 520 may be formed in a flat plane shape in its region adjacent to the lower end of the bent portion 510, and may be formed in a curved shape such as an arc shape in its region corresponding to the range of the elastic bumps 220 of the bump foil 200. In addition, the inner top foil 500 may include a through hole 540 formed in a central portion of one end thereof in the circumferential direction, in which the central portion is a position between both sides of the inner top foil 500 in the width direction, and passing through the inside and outside of the inner top foil 500; and a fixed tab 530 formed at the other end of the inner top foil 500 in the circumferential direction by extending from the central portion of the inner top foil 500 in the width direction. In addition, as shown in the drawings, the inner top foil 500 may be rolled in one or more turns, and the other end of the inner top foil 500 may have a portion overlapping one end thereof. Here, the fixed tab 530 of the inner top foil 500 may pass through the through hole 540 formed in one end of the inner top foil 500 to be inserted into and coupled to the through hole 540. In addition to this type, the inner top foil 500 may be formed in various shapes. In addition, a rotor 600 may be inserted into and spaced apart from the inner top foil 500, and a coating film including Teflon or the like may be formed on an inner circumferential surface of the inner top foil 500 to reduce friction caused by contact between the rotor 600 and the inner top foil 500 when the rotor 600 is rotated. Therefore, the rotor 600 may float away from the inner top foil 500 by pressure of air flowing when the rotor 600 is rotated inside the inner top foil 500 at a high speed in the counterclockwise direction, and may be smoothly rotated. In embodiments, the rotor 600 may have a rotation direction opposite to a direction in which the curved portion 520 extends with respect to the bent portion 510 in which the inner top foil 500 is coupled and fixed to the bearing housing 100.

A middle top foil 400 may be interposed between the outer top foil 300 and the inner top foil 500 and may serve a damping function to reduce vibration and friction occurring therebetween. In addition, one end of the middle top foil 400 disposed in the circumferential direction may be bent outward in the radial direction to form a bent portion 410, and the bent portion 410 may be inserted into the key groove 120, thereby fixing the middle top foil 400 to the bearing housing 100. In addition, the middle top foil 400 may have a damping portion 420 extending from a lower end of the bent portion 410 in the clockwise direction. Here, the damping portion 420 may be formed in a flat plane shape in its region adjacent to the lower end of the bent portion 410, and may be formed in a curved shape such as an arc shape in its region corresponding to the range of the elastic bumps 220 of the bump foil 200. In addition, the other end of the middle top foil 400 in the circumferential direction may be formed as a free end, and the end portion of the middle top foil 400 may thus move freely. As shown in the drawings, the middle top foil 400 may be rolled in about half a turn, and thus one end of the middle top foil 400 may be disposed on its upper side and the other end may be disposed on its lower side. In addition, the middle top foil 400 may have a through hole 440 formed in a central portion adjacent to the bent portion 410, in which the central portion is a position between both sides of the middle top foil 400 in the width direction, and passing through the inside and outside of the middle top foil 400. In addition to this type, the middle top foil 400 may be formed in various shapes. Here, the through hole 340 of the outer top foil 300, the through hole 440 of the middle top foil 400, and the through hole 540 of the inner top foil 500 may be arranged at positions corresponding to one another. In addition, the fixed tab 330 of the outer top foil 300 and the fixed tab 530 of the inner top foil 500 may pass through and be coupled to all the through holes respectively formed in the three top foils in a shape in which portions of the fixed tabs 330 and 530 protrude outward from the outer circumferential surface of the outer top foil 300. In addition, both the fixed tab 330 of the outer top foil 300 and the fixed tab 530 of the inner top foil 500 may be disposed to pass through the through hole 240 formed in the middle portion between both the sides of the free end 230 of the bump foil 200. Accordingly, the fixed tab 330 of the outer top foil 300, the fixed tab 530 of the inner top foil 500 and the free end 230 of the bump foil 200 may be arranged at a position overlapping one another in the radial and circumferential directions. Here, as shown in the drawings, when viewed from the front, the fixed tab 330 of the outer top foil 300 and the fixed tab 530 of the inner top foil 500 may each be formed in a shape of a straight line in a direction tangential to the circumferential direction, and may each be disposed to intersect the free end 230 of the bump foil 200. Here, the fixed tabs 330 and 530 of the outer top foil 300 and the inner top foil 500 may be disposed at a position overlapping the free end 230 of the bump foil 200 at at least one point of in the radial and circumferential directions. In embodiments, the disposition and coupling structure of the through hole 240 formed in the central portion of the foil in the width direction may serve as a deviation prevention portion at the fixed tab 330 of the outer top foil 300, the fixed tab 530 of the inner top foil 500 and the free end 230 of the bump foil 200, and accordingly, the free end 230 of the bump foil 200 may not be deviated from the bearing housing 100 in the width direction. In addition, the other end of the outer top foil 300 and that of the inner top foil 500 may respectively be coupled to one end of the outer top foil 300 and that of the inner top foil 500, the other side of the outer top foil 300 and that of the inner top foil 500 may be prevented from being deviated from the bearing housing in the width direction. In addition, the fixed tab 330 of the outer top foil 300 and the fixed tab 530 of the inner top foil 500 may be formed in a position spaced apart from one side with respect to the center of the foil in the width direction, and the fixed tabs may thus be asymmetrical with respect to the center of the foil in the width direction. Here, the through hole 240 of the bump foil 200, the through hole 340 of the outer top foil 300, the through hole 440 of the middle top foil 400 and the through hole 540 of the inner top foil 500 may each be formed at a position corresponding to the positions of the fixed tabs 330 and 530.

Accordingly, the air foil journal bearing of the present disclosure may prevent the free end of the bump foil from being deviated to the outside of the bearing housing due to the vibration occurring when the rotor is rotated at a high speed, thereby preventing the bump foil from being deformed and damaged. In addition, the inner top foil, the middle top foil and the outer top foil may be assembled integrally with one another and fixed to the bearing housing, and the foils may thus be easily assembled to one another.

In addition, in the air foil journal bearing according to the present disclosure, the other end of the inner top foil 500 may be rolled in more than one turn, and the other end of the inner top foil 500 may thus have a portion overlapping one end of the inner top foil 500 in the circumferential direction; and the other end of the inner top foil 500 may be disposed inside one end of the inner top foil 500 in the radial direction and the two ends may be in contact with each other. In addition, the outer top foil 300 and the other end of the inner top foil 500 excluding the fixed tabs 330 and 530 may extend until the end portion of the free end 230 of the bump foil 200 in a circumferential direction. The other end of the inner top foil 500 may be disposed outward from an extension line of the inner circumferential surface of the curved portion 520 in the radial direction. Therefore, the other end of the inner top foil 500 may be supported by the one end of the inner top foil 500, and when the air flowing by the high-speed rotation of the rotor passes near the other end of the inner top foil, the air flow may have a minimized interference. The vibration occurring in the foils and the rotor may thus be suppressed, and the rotor may have improved dynamic stability.

Figure 7:
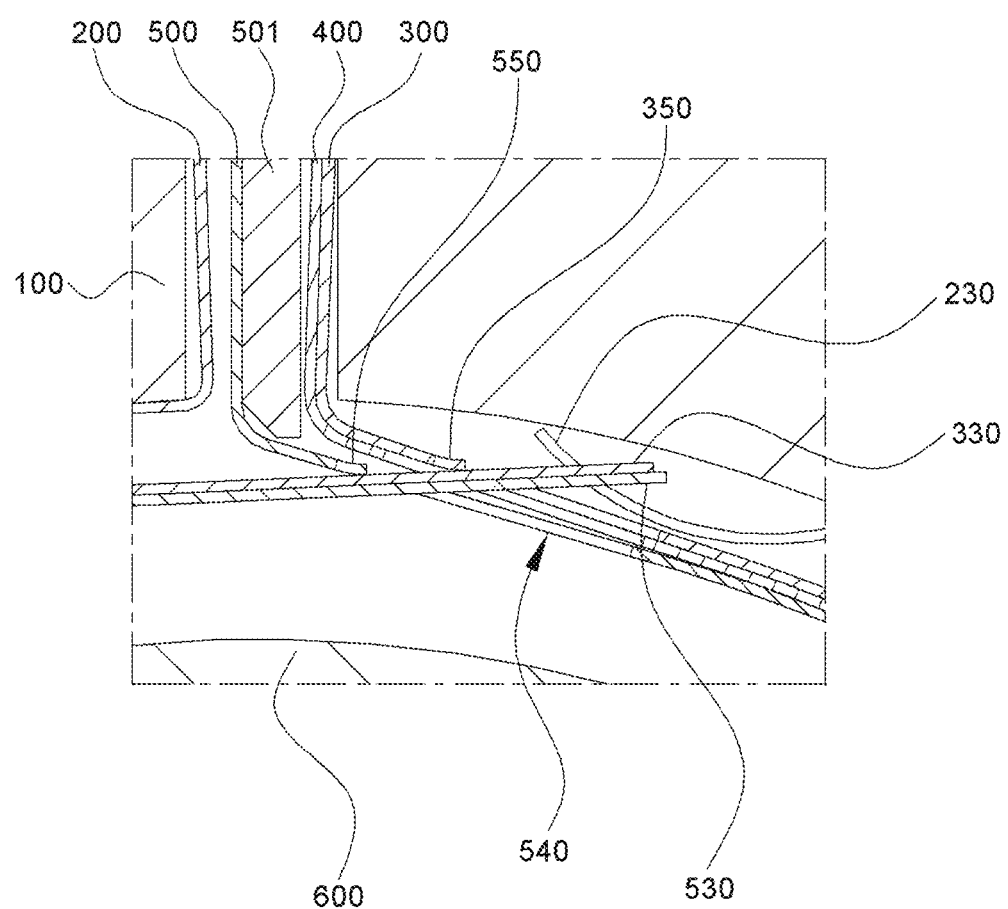
FIG. 7 is a partially enlarged view of FIG. 6.

FIG. 7 is a partially enlarged view showing the front cross-sectional view partially showing the air foil journal bearing according to an embodiment of the present disclosure.

Referring to FIG. 7, the inner top foil 500 may have a support protrusion 550 formed inward from a circumference of the through hole 540, and the outer circumferential surface of the outer top foil 300 may be in contact with and elastically supported by the support protrusion 550. Here, the fixed tab 330 of the outer top foil 300 may be supported by the support protrusion 550 of the inner top foil 500, and the fixed tab 330 of the outer top foil 300 and the fixed tab 530 of the inner top foil 500 may be overlapping each other and thus be supported by the support protrusion 550 together.

Therefore, a clearance, which is a gap between the rotor and the inner top foil, may be reduced by the support protrusion of the inner top foil. As the clearance may be adjusted based on the pressure of the air formed when the rotor is rotated, power loss of the air foil journal bearing may be reduced, and the temperature rise may also be reduced. In addition, the clearance may be adjusted based on a length or shape of the support protrusion, and the support protrusion may serve a damping function for the vibration.

In addition, a slot 560 may be formed in each of the sides of the support protrusion 550 of the inner top foil 500 in the width direction. In embodiments, the slot 560 may be formed in a shape of a cut connected to the through hole 540, and the support protrusion 500 may extend in the form of a cantilever from the one side of the through hole 540 in the circumference direction. Therefore, the support protrusion 550 may be easily formed, and an elastic force of the support protrusion 550 may be adjusted based on a length of the slot 560.

In addition, like the inner top foil 500, the outer top foil 300 may also have a support protrusion 350 formed inward from a circumference of the through hole 340, and the outer circumferential surface of the outer top foil 300 may be in contact with and elastically supported by the support protrusion 350. Therefore, the fixed tab 530 of the outer top foil 300 may be supported by the two support protrusions 350 and 550, and thus have a greater elastic support. In addition, a slot 360 may be formed in each of the sides of the support protrusion 350 of the outer top foil 300 in the width direction.

Figure 8:
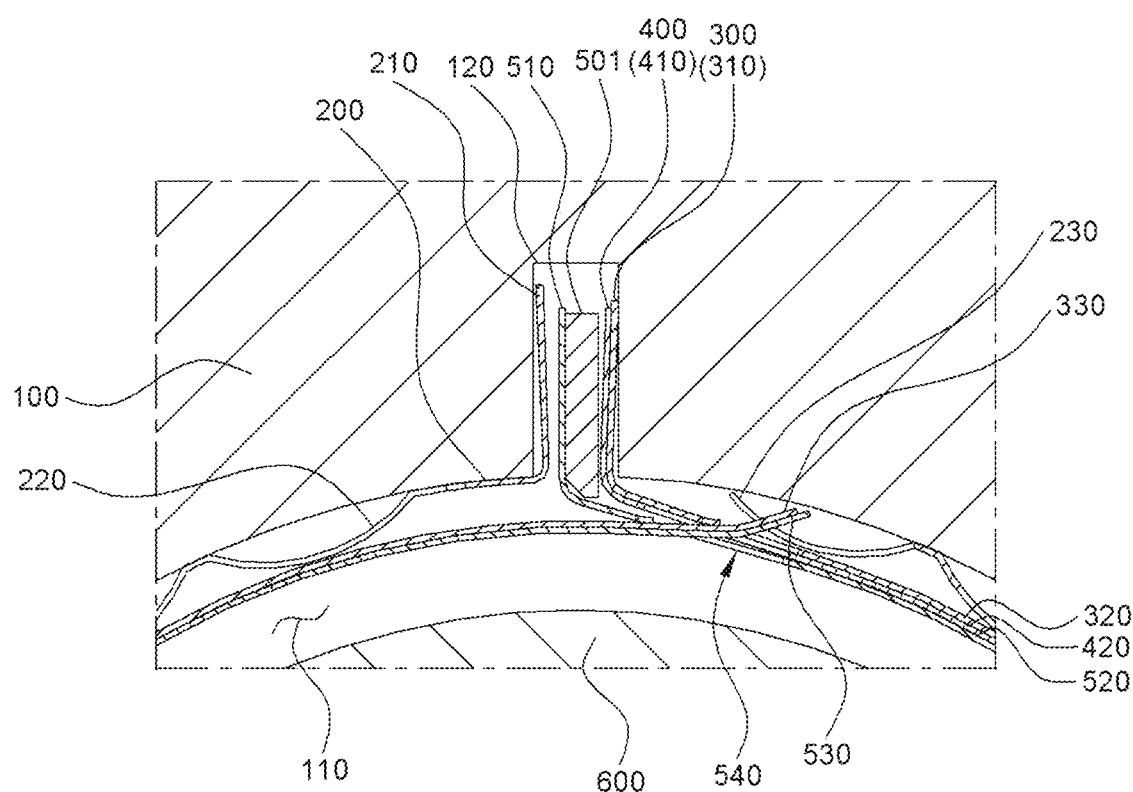
FIG. 8 is a front cross-sectional view partially showing a modified embodiment of fixed tabs of an outer top foil and an inner top foil in the air foil journal bearing according to an embodiment of the present disclosure.

FIG. 8 is a front cross-sectional view partially showing a modified embodiment of fixed tabs of an outer top foil and an inner top foil in the air foil journal bearing according to an embodiment of the present disclosure.

Referring to FIG. 8, the fixed tab 330 of the outer top foil 300 and the fixed tab 530 of the inner top foil 500, which each serves as the deviated prevention portion, may each have a cross-section of a curved line inflected from the curved portion 320 or 520 while moving from the curved portion 320 or 520 to the other end of the foil 300 or 500. Therefore, even if the elastic bump 220 of the bump foil 200 is pressed or an external force is released to move or change the position of the free end 230 in the circumferential direction, the fixed tabs 330 and 530 may be maintained in a state of always crossing the free end 230 of the bump foil 200. In this manner, it is possible to prevent the deviation of the free end of the bump foil in the width direction.

As set forth above, the present disclosure may prevent the free end of the bump foil from being deviated from the air foil journal bearing supporting the radial load of the rotor.

The present disclosure is not limited to the abovementioned embodiments, and may be variously applied. In addition, the present disclosure may be variously modified by those skilled in the art to which the present disclosure pertains without departing from the gist of the present disclosure claimed in the claims.

What is claimed is:

1. An air foil journal bearing comprising:
a bearing housing having a through hole in which a rotor is disposed;
a bump foil disposed inside the bearing housing and formed in a circumferential direction thereof, having an elastic bump, having one end coupled and fixed to the bearing housing in the circumferential direction, and having the other end formed as a free end;
an outer top foil disposed inside the bump foil, formed in the circumferential direction, and having one end coupled and fixed to the bearing housing;
an inner top foil disposed inside the outer top foil, formed in the circumferential direction, and having one end coupled and fixed to the bearing housing; and
a middle top foil interposed between the outer top foil and the inner top foil, formed in the circumferential direction, and having one end coupled and fixed to the bearing housing,
wherein the outer top foil and the inner top foil each have a fixed tab formed by extending from a portion between both sides of the other end of the foil in a width direction thereof, and the outer top foil, the middle top foil and the inner top foil each have a through hole formed at one side thereof, the through hole passing through the inside and outside of the foil at a position corresponding to a position of the fixed tab of the inner top foil,
the free end of the bump foil has a through hole passing through the inside and outside of the foil at a position corresponding to a position of the fixed tabs formed between both the sides of the free end in the width direction, and
the outer top foil and the inner top foil are each rolled in one or more turns, and the fixed tabs of the outer top foil and inner top foil are each inserted through and disposed in the through holes of the inner top foil, the middle top foil, the outer top foil and the bump foil.

2. The air foil journal bearing of claim 1, wherein the fixed tabs of the outer top foil and inner top foil each extend to have a cross-section of a straight line or a cross-section of a curved line inflected from a curved portion of the foil.

3. The air foil journal bearing of claim 1, wherein the through hole of the bump foil has a shape in which a portion of the free end is open in the circumferential direction.

4. The air foil journal bearing of claim 1, wherein the inner top foil has a support protrusion protruding inward from a circumference of its through hole, and an outer circumferential surface of the outer top foil is in contact with and elastically supported by the support protrusion.

5. The air foil journal bearing of claim 4, wherein a slot is formed in each of the sides of the support protrusion of the inner top foil in the width direction.

6. The air foil journal bearing of claim 4, wherein the outer top foil has a support protrusion protruding inward from a circumference of its through hole, and an outer circumferential surface of the outer top foil is in contact with and elastically supported by the support protrusion.

7. The air foil journal bearing of claim 6, wherein a slot is formed in each of the sides of the support protrusion of the outer top foil in the width direction.

8. The air foil journal bearing of claim 1, wherein the fixed tabs of the outer top foil and inner top foil are formed to be bent outward in a radial direction of the foil, and the fixed tabs protrude outward from the outer circumferential surface of the outer top foil, and the fixed tabs are each disposed at a position overlapping the free end of the bump foil at at least one point in the radial and circumferential directions.

9. The air foil journal bearing of claim 1, wherein the free end of the bump foil is formed as the elastic bump having a convexly curved surface inward in the radial direction, and a peak portion of the elastic bump forming the free end is disposed adjacent to or in contact with the outer circumferential surface of the outer top foil.

\* \* \* \* \*